United States Patent Office 3,535,400
Patented Oct. 20, 1970

3,535,400
PROCESS FOR THERMALLY SPLITTING
ISOBUTYRALDEHYDE
Jurgen Falbe, Dinslaken, and Heinz-Dieter Hahn, Oberhausen-Sterkrade-Nord, Germany, assignors to Ruhrchemie Aktiengesellschaft, Oberhausen-Holten, Germany, a corporation of Germany
No Drawing. Filed Jan. 3, 1969, Ser. No. 788,920
Claims priority, application Germany, Jan. 20, 1968,
1,668,647
Int. Cl. C01b 1/13, 31/18; C07c 1/20
U.S. Cl. 260—682
6 Claims

ABSTRACT OF THE DISCLOSURE

Process for thermally splitting isobutyraldehyde to form a gas mixture composed essentially of propylene, carbon monoxide and hydrogen comprising heating isobutyraldehyde at a temperature of between 500 and 800° C. in the presence of steam.

This invention relates to a process for thermally splitting isobutyraldehyde.

More particularly this invention relates to thermally splitting isobutyraldehyde to form valuable products.

The catalytic hydroformylation of most olefinically unsaturated compounds insofar as such compounds are not symmetrical and incapable of isomerization of the olefinic bond, as for instance ethylene and cyclopentene, with carbon monoxide and hydrogen, the so called oxo-synthesis results in mixtures of several isomeric aldehydes (see J. Falbe, Synthesen mit Kohlenmonoxyd, Springer Verlag Berlin-Heidelberg-New York, 1967, page 7). For instance, when propylene is subjected to the reaction, a mixture of n- and iso-butyraldehyde in a molar proportion of about 3:1 is obtained. While n-butyraldehyde represents a valuable starting material for numerous technical processes, it has hitherto not been possible, to economically use the isobutyraldehyde.

It is an object of the invention to provide a process for utilizing isobutyraldehyde to economic advantage.

Another object of the invention is to provide a process for splitting isobutyraldehyde to form a gas mixture essentially comprising propylene, carbon monoxide and hydrogen.

Still another object of the invention is to provide a process for splitting isobutyraldehyde to form propylene, carbon monoxide and hydrogen in reciprocation of the hydroformylation reaction according to the following reaction equation:

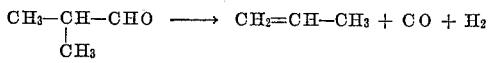

and by recirculating the gas mixture thereby obtained to the oxo-synthesis reaction to increase significantly the yield of n-butyraldehyde from a given amount of propylene accompanied by a decrease of the amount of isobutyraldehyde necessarily produced.

These and other objects and advantages of the invention will become apparent from the following disclosure.

From the literature it is known to split aliphatic aldehydes by thermal treatment to thereby form lower molecular products. According to work carried out by S. K. Ho, Roy. Soc., A. 276 (1963), pages 278–292, products predominating in propane and carbon monoxide in addition to small proportions of propylene and hydrogen are thereby obtained. It is of interest, that it was herein established that the presence of propylene and other olefins check the splitting process.

Furthermore, the photochemical decarbonylation of aldehydes has been described by F. E. Blacet, R. A. Crane, J. Am. Soc. 76 (1954), page 5337. Aside from the fact, that such process can at most be of importance for laboratory use because of the high energy requirements, it suffers from the important disadvantage, that only minor amounts of olefins are thereby obtainable, so that the product gas cannot thereafter be converted into aldehydes by the oxo-synthesis reaction.

According to a publication of R. H. Prince, K. A. Raspin, Chem. Comm. 1966, page 156, it is possible to split isobutyraldehyde in the presence of complex ruthenium compounds with formation of propylene. This reaction requires a stoichiometric amount of aldehyde and ruthenium compound and is therefore not suitable for technical applications.

Finally, propylene can also be obtained by catalytic decomposition of isobutyraldehyde with for instance palladium or copper catalysts (see H. J. Hagemeyer, G. C. De Croes, The Chemistry of Isobutyraldehyde, Tennessee Eastman Company 1954, page 55). This process has the essential drawback, that further hydrogenation of the propylene to undesired propane by which propylene as well as hydrogen are wasted and lost as far as the oxo-synthesis is concerned, cannot be eliminated. Further in this process the catalysts are inactivated even after short reaction time.

The drawbacks of the known processes as above set out are avoided and the objects as above set out accomplished by the process according to the invention.

In accordance with the invention it has now been found that isobutyraldehyde can be thermally split to form a gas mixture composed substantially of propylene, carbon monoxide and hydrogen by heating the isobutyraldehyde at a temperature of between 500 and 800° C. in the presence of steam and if desired at increased pressure.

It must be considered as highly surprising that isobutyraldehyde can be thermally converted with high yields to products representing valuable starting materials for numerous synthesis.

In a particular advantageous embodiment of the invention, the splitting process is carried out in a temperature range of from 650 to 680° C. At temperatures below 600° C., the conversion is incomplete and the isobutyraldehyde remains partially unchanged. Above 700° C., the propylene yield decreases and increasing amounts of methane and ethylene are obtained. As from about 800° C., the formation of such products preponderates, splitting may in special instances be carried out under those temperature conditions.

In any event it is essential to carry out the splitting process in the presence of steam in order to prevent coke deposition. The amount of steam required depends for the most part on the reaction temperature. Thus, for instance, at a working temperature of 650° C., 70 parts by weight of steam per 100 parts by weight of isobutyraldehyde are sufficient to prevent coke deposition. By increasing the amount of steam, it is possible to increase the propylene yield and simultaneously to improve the ratio of propylene to propane in the product gas. For instance, the propylene yield can be increased by 11% and simultaneously the propylene to propane ratio increased from 2.6:1 to 5.6:1, if the water to isobutyraldehyde ratio is increased from 0.9:1 to 3.0:1 at a temperature of 650° C. However, it must be appreciated that with increasing dilution of the isobutyraldehyde and with the same reaction times, the conversion decreases. It is therefore particularly advantageous to employ a weight ratio of isobutyraldehyde to steam of between 1 to 0.5 and 1 to 5.0 and preferably between 1 to 1.5 and 1 to 2.0.

It is of particular interest, that the composition of the products obtained from the splitting off of isobutyraldehyde by the process according to the invention is broadly independent of the reaction time under otherwise constant conditions. Therefore, by choosing a suitable throughput rate, isobutyraldehyde can be quantitatively converted in a one stage process without any loss of valuable products. If in special instances only partial conversion is attained due to low reaction temperatures or short conversion times, unchanged isobutyraldehyde can be recirculated to the process without previous purification. Methacrolein formed by incomplete splitting in amounts of up to 5% dependent upon the amount of recovered isobutyraldehyde does not disadvantageously affect the reaction, since it is also decomposed under reaction conditions.

A particular advantage of the process according to the invention is the fact, that no purification of the isobutyraldehyde to be converted is required. For instance, sulfur containing impurities and oxidation products of isobutyraldehyde do not disturb the conversion.

The apparatus suitable for use in the process of the invention is very simple. The splitting can for instance be carried out in a conventional tube reactor equipped with a heating device and, if desired, charged with inert filling bodies. Advantageously, the isobutyraldehyde is heated together with the steam at a temperature of between 400 and 500° C. in a preheater, in order to attain uniform temperature conditions. The reaction product leaving the reactor is at first passed through a heat exchanger and thereafter freed from condensation water in a separator. The gas mixture consisting essentially of propylene, carbon monoxide and hydrogen can be directly subjected to the hydroformylation. If it contains higher amounts of ethylene, the latter can be removed therefrom in an additional processing stage.

The following examples are given in order to illustrate the invention but are in nowise to be construed as a limitation of the scope thereof.

EXAMPLES 1–6

The runs corresponding to Examples 1–6 were carried out in an apparatus consisting of preheater, reactor, cooler, separator and an analyzing device as follows:

Isobutyraldehyde and water were jointly vaporized in the preheater, heated to a temperature of between 400 and 450° C. and introduced into the reactor manufactured of a stainless steel tube (trade name V2A having a length of 54 cm. and an inner diameter of 32 mm. The splitting of the isobutyraldehyde was carried out at conventional pressure and at the temperatures hereinafter set out in the table. The split gas product was cooled in an intensively agitated cooler to 0 to 2° C. to separate out the water, unconverted butyraldehyde and methacrolein formed as by products. The organic phase which consisted of isobutyraldehyde and methacrolein as well as the aqueous phase, which possibly contains a few percent of isobutyraldehyde were vaporized by heating to a temperature of between 400 and 450° C. and recirculated to the reactor.

In order to remove the last amounts of condensate contents still contained in the splitting gas, the gas was then passed through a cooling trap cooled to −30° C. Its composition was thereafter determined by gas chromatography as well as by the Orsat-method.

TABLE.—THERMAL SPLITTING OF ISOBUTYRALDEHYDE IN PRESENCE OF STEAM

| Test | Isobutyr-aldehyde throughput, g./hr. | Proportion by weight water:aldehyde | Conversion, percent | Reaction temp., °C. | CO | $H_2$ | Propylene | Propane | Ethylene | Ethane | $CO_2$ | Methane | Molar proportion propylene:propane |
|---|---|---|---|---|---|---|---|---|---|---|---|---|---|
| 1 | 48 | 2.4:1 | 39 | 650 | 102.6 | 79.1 | 71.9 | 6.6 | 12.2 | | 18.5 | 10.9 | 10.8 |
| 2 | 72 | 0.93:1 | 36 | 653 | 108.4 | 68.4 | 55.6 | 21.4 | 11.5 | 2.5 | 17.7 | 14.9 | 2.6 |
| 3 | 72 | 3.7:1 | 26 | 650 | 94.3 | 69.0 | 72.0 | 11.5 | 12.3 | 1.7 | 9.3 | 17.7 | 6.2 |
| 4 | 72 | 1.8:1 | 35 | 650 | 91.7 | 75.5 | 66.7 | 15.7 | 12.0 | 2.0 | 10.7 | 13.3 | 4.2 |
| 5 | 72 | 1.88:1 | 93 | 738 | 126.0 | 65.9 | 57.0 | 5.3 | 19.2 | 1.6 | 9.1 | 35.1 | 10.8 |
| 6 | 180 | 3.3:1 | 19 | 650 | 102.5 | 77.5 | 72.2 | 10.3 | 12.1 | 1.2 | 14.3 | 13.1 | 7.0 |

We claim:
1. Process for thermally splitting isobutyraldehyde which comprises heating isobutyraldehyde at a temperature of from 500 to 800° C. in the presence of steam and recovering the gas mixture consisting essentially of propylene, carbon monoxide and hydrogen thereby formed.

2. Process according to claim 1 which comprises carrying out the heating at a temperature of from 650 to 680° C.

3. Process according to claim 1 which comprises utilizing the isobutyraldehyde and steam in a weight ratio of from 1:0.5 to 1:5.0 of isobutyraldehyde to steam.

4. Process according to claim 1 which comprises utilizing the isobutyraldehyde and steam in a weight ratio of from 1:1.5 to 1:2.0 of isobutyraldehyde to steam.

5. Process according to claim 1 which comprises effecting said heating at an increased pressure.

6. Process for hydroformylating propylene which comprises reacting propylene, carbon monoxide and hydrogen in the presence of a hydroformylation catalyst, recovering the mixture of n- and i-butyraldehyde thereby obtained, separating the n-butyraldehyde from the i-butyraldehyde, heating the i-butyraldehyde at a temperature of from 500–800° C. in the presence of steam, recovering the gas mixture consisting essentially of propylene, carbon monoxide and hydrogen and recycling the said gas mixture to the hydroformylation.

References Cited

UNITED STATES PATENTS 3,391,193  7/1968  Coyne et al. _____ 260—601

OTHER REFERENCES

S. K. Ho: "The Thermal Decomposition of Aliphatic Aldehydes," Proc. Royal Soc. (London), A276, 278–292 (1963).

DELBERT E. GANTZ, Primary Examiner

G. E. SCHMITKONS, Assistant Examiner

U.S. Cl. X.R.

23—204, 210; 260—601, 604